(12) United States Patent
Shaft et al.

(10) Patent No.: US 6,395,321 B1
(45) Date of Patent: *May 28, 2002

(54) PROCESS FOR SEALING FOOD PRODUCTS SUCH AS PROCESSED CHEESE SLICES

(75) Inventors: David L. Shaft, Green Bay; George O. Schroeder, Waupaca, both of WI (US)

(73) Assignee: Schreiber Foods, INC, Greenbay, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/323,766

(22) Filed: Jun. 1, 1999

(51) Int. Cl.[7] ................................................ B65B 9/20
(52) U.S. Cl. ...................... 426/410; 426/414; 426/415; 53/435; 53/440; 53/450; 53/451; 53/479
(58) Field of Search ................................ 426/414, 130, 426/399, 410, 415; 53/435, 449, 450, 451, 479, 122, 518, 550, 551

(56) References Cited

U.S. PATENT DOCUMENTS

| | | | |
|---|---|---|---|
| 3,542,570 A | | 11/1970 | Bush et al. |
| 3,625,348 A | * | 12/1971 | Widiger et al. ............. 426/130 |
| 3,673,041 A | * | 6/1972 | Schulz et al. ................ 426/410 |
| 4,015,021 A | * | 3/1977 | Harima ........................ 426/414 |
| 4,362,784 A | * | 12/1982 | Kato ........................... 426/130 |
| 4,447,464 A | * | 5/1984 | Schwaltz et al. ........... 426/414 |
| 4,557,103 A | * | 12/1985 | Schwartz et al. ........... 426/130 |
| 5,112,632 A | | 5/1992 | Meli et al. |
| 5,182,128 A | * | 1/1993 | Larace ........................ 426/414 |
| 5,347,792 A | | 9/1994 | Meli et al. |
| 5,440,860 A | | 8/1995 | Meli et al. |
| 5,492,757 A | | 2/1996 | Schuhmann et al. |
| 5,498,474 A | | 3/1996 | Schuhmann et al. |
| 5,501,901 A | | 3/1996 | Schulmann et al. |
| 5,516,563 A | | 5/1996 | Schumann et al. |
| 5,619,844 A | * | 4/1997 | Meli et al. .................. 426/414 |
| 5,701,724 A | * | 12/1997 | Meli et al. .................. 426/414 |
| 5,716,698 A | | 2/1998 | Schreck et al. |
| 5,800,851 A | * | 9/1998 | Meli et al. .................. 426/414 |
| 5,800,913 A | | 9/1998 | Mauer et al. |
| 5,811,185 A | | 9/1998 | Schreck et al. |

FOREIGN PATENT DOCUMENTS

| | | | | |
|---|---|---|---|---|
| CA | 553322 | * | 2/1958 | ................ 426/414 |
| GB | 899176 | * | 3/1960 | ................ 426/414 |

OTHER PUBLICATIONS

Wiley Encyclopedia of Packaging Technology J. Wiley & Sons pp.1446, 574–578, 697–700, 1986.*
Brochure by Shell: "Convenience Packaging & Easy–Open Systems Containing Polybutylene", No Date.
Johan De Clippeleir: "PE/PB1 Blends for Film Applications", 1997.
E. I. du Pont de Nemours and Company: Product Information titled "Appeel and Bynel Resins for Lidding Sealant Application", 1996.
Mitsui Petrochemical Industries, Ltd.: "TAFMER A/P" and "TAFMER XR", No Date.
Chevron Chemical Company: Technical Data Sheet re: Polyethylene Group, Jun. 98.
Pierce & Stevens Corp.: Product Information Sheet for "Proxmelt B4144R Extrudable Resin", No Date.
Pierce & Stevens Corp.: "Product Information Sheet for PROXSEAL J9660E Lidding Adhesives", No Date.
Dow Plastics, a group of The Dow Chemical Company: Technical Information for "Affinity EG 8200–Polyolefin Plastomer for General Plastomeric Applications", No Date.

* cited by examiner

*Primary Examiner*—Steven Weinstein
(74) *Attorney, Agent, or Firm*—Michael P. Mazza; Niro, Scavone, Haller & Niro

(57) ABSTRACT

A method for packaging food items, such as processed cheese, into a plastic film package that entirely encloses the food item with peelable heat seals, such as hermetic peelable heat seals. The heat of the food item is used to activate a sealant within the plastic film. Plastic film formulations are provided for this purpose.

30 Claims, 1 Drawing Sheet

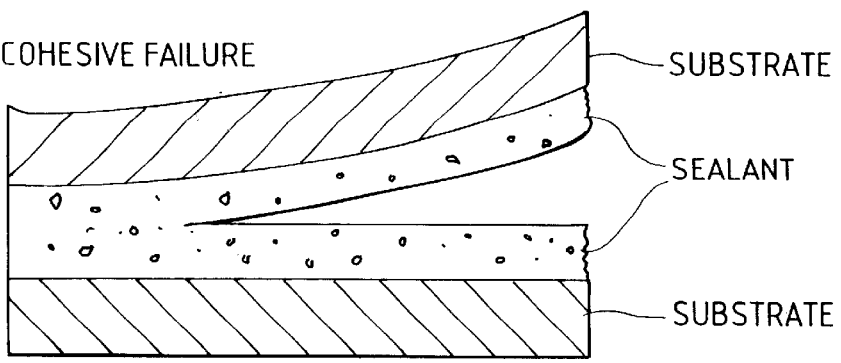
FIG. 1A COHESIVE FAILURE
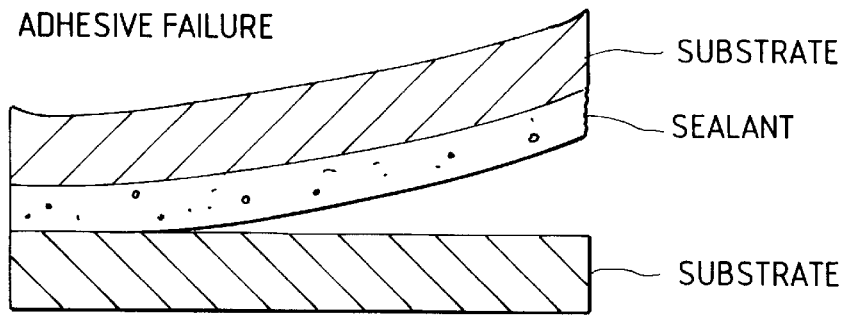
FIG. 1B ADHESIVE FAILURE
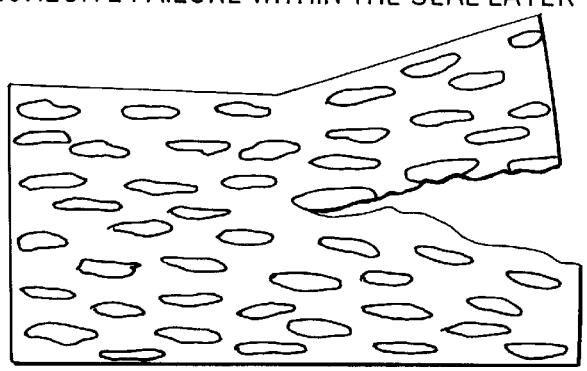
FIG. 2 COHESIVE FAILURE WITHIN THE SEAL LAYER
SEPARATION OF SEAL LAYER TENDS TO OCCUR WHERE THE TWO PHASES MEET.

PROCESS FOR SEALING FOOD PRODUCTS SUCH AS PROCESSED CHEESE SLICES

BACKGROUND OF THE INVENTION

The invention relates to the formation of packages for individual slices of food items, particularly processed cheese slices. More specifically, the invention is directed to the formation of food packages using new film materials in which a heated cross-seal is formed using the heat of the food item to activate a film sealant.

The packaging of processed cheese slices as practiced by cheese converters is a highly sophisticated technology which has continued to evolve over most of this century. As explained in more detail below, while heat plays a critical role in current package sealing techniques for processed cheese, it is carefully controlled using external heating devices since a temperature that is too high can have a deleterious impact on the processed cheese.

It is known to continuously package processed cheese slices in wrapped packages (see, e.g., U.S. Pat. No. 3,542,570 to Bush et. al. and U.S. Pat. No. 5,347,792 to Meli et. al. (Meli I)), including those that are hermetically sealed (see, e.g., U.S. Pat. Nos. 5,112,632 and 5,440,860, each to Meli et. al. (Meli II)). The Bush, Meli I and Meli II patents, each owned by the current assignee, are hereby incorporated by reference herein in their entirety.

Various packaging films have been used for this purpose. Known packaging films include coextruded films, such as films having a base layer of polypropylene, polyethylene or HDPE (high density polyethylene), with a sealant layer. One known sealant layer is polyethylene, for example, which may or may not have an intermediate adhesive layer, as disclosed in the Meli II patent. Coextruded "hot melt" films are also known in which the sealant layer is activated by heat. Upon activation, the "hot melt" sealant layer flows, allowing it to bond either to itself or to a base layer.

Coextruded "hot melt" packaging films have been known for at least about 25 years. However, no known coextruded "hot melt" packaging film has been provided that has a sealant layer designed to be activated by the heat of the processed cheese itself, and which results in peelable heat seals. Extruded "hot melt" films have tended to provide seals which fail through adhesive failure, as opposed to cohesive failure, often resulting in an unsightly seal which may not be peelable. These films also typically have sealants with activation temperatures that substantially exceed 200° F. However, it has been found that such temperatures have a detrimental impact on processed cheese. Thus, while it is known to heat packaging film using external heating devices so as to form seals (see, e.g., the Bush, Meli I and Meli II patents), it is not believed to be known to provide a process for packaging peelably-sealed processed cheese slices in which cross-seals are formed using only the heat of the cheese as the sealant activating agent.

Despite its obvious advantages, the current lack of a peelable package enclosed by heat seals activated by the heat of the processed cheese is believed mainly due to the general unavailability of suitable packaging films whose sealant layers have sufficiently low melt temperatures such that the heat of the processed cheese will activate the sealant layer. It may also be due to the relatively recent recognition of the importance of providing processed cheese slice packages completely enclosed by heat seals that are also manually peelable (1989, Meli II), a recognition which is still gaining industry appeal.

Accordingly, it is an object of the present invention to provide heat-sealed, film packaged processed cheese slices, using the heat of the cheese as the film sealant activating agent.

It is another object of the invention to provide such packaged cheese slices in film packages having peelable seals.

It is another object of the invention to provide a process that can be practiced using existing machines that are easily retrofitted or adapted for use with the present invention.

It is a further object of the invention to provide film materials that can be used to accomplish the objects just mentioned.

DEFINITION OF CLAIM TERMS

The following terms are used in the claims of the patent as filed and are intended to have their broadest meaning consistent with the requirements of law.

"Heat seal" is a seal effected through the application of heat to elevate the temperature of a film sealant, enabling the sealant to flow and causing an attraction and/or bond between the sealant and either itself or another portion of the film.

"Peelable" refers to a seal which may be manually broken by a consumer without rupturing or tearing of the film.

"Adhesive failure" means a seal failure mode in which a film sealant layer separates from a base or substrate film layer.

"Cohesive failure" means a seal failure mode in which portions of a film sealant layer(s) separate from itself/themselves.

Where alternative meanings are possible, the broadest meaning is intended. All words used in the claims are intended to be used in the normal, customary usage of grammar and the English language.

SUMMARY OF THE INVENTION

The objects mentioned above, as well as other objects, are solved by the present invention, which overcomes disadvantages of prior art packaging methods and films, while provided new advantages not previously obtainable.

In one embodiment of the present invention, a method is provided for peelably packaging processed cheese slices using a plastic film having at least one base layer, such as polypropylene, and at least one sealant layer. First, the plastic film is formed into an elongated enclosure having an opening. Then, a longitudinal heat seal is provided that closes the opening. Hot molten processed cheese is now provided into the elongated enclosure. Then, opposing portions of the plastic film are compressed across the length of the film at cross-sealing zones formed at periodic intervals along the length of the enclosure to remove at least some of the processed cheese from the cross-sealing zones. The heat of the processed cheese activates the at least one sealant layer and the combination of the heat of the processed cheese and the compression forms heat seals at the cross-sealing zones, resulting in a package entirely enclosed by peelable heat seals. Alternatively, at least some of or all of the processed cheese can be removed from the cross-sealing zones prior to the compression step. The heat seals are preferably cooled immediately after their formation, using expedient means such as cooling water.

In a preferred embodiment, the step of compressing is accomplished using a two-step process in which the elongated film enclosure containing the processed cheese is passed through a pair of opposed flattening belts having periodic protrusions and then through a rotary crimping device. Alternatively, for example, the step of compressing may be accomplished by passing the elongated film enclosure through a pair of opposed, substantially smooth flattening belts and then through a crimping device.

In another preferred embodiment, both the longitudinal seal and the cross-seals are each hermetic, so that a hermetically sealed package entirely enclosing the processed cheese is formed.

In one embodiment, the plastic film may be extruded and be a non-oriented polyolefin-based formulation, such as polypropylene film. In other embodiments, the plastic film may also be a solution cast or calendered material.

In alternative preferred embodiments, the sealant layer may consist of one or more of the following: polybutylene; ethylene acrylic acid; metallocene polyethylenes; ethylene-octene copolymer; ethylene-alpha olefin copolymer; propylene alpha olefin copolymer; ethylene alpha olefin copolymer; Surlyn®; DuPont Appeel®; Montell PB®; ethylene methyl acrylate copolymer; or a polyolefin or its derivatives.

In a preferred embodiment, the film sealant will have an activation temperature below 200° F., and preferably below about 180° F.–190° F. While, in a preferred embodiment, the cross-seals fail through cohesive failure, in another embodiment they may fail through adhesive failure. Preferably the cross-seals, upon being peeled, provide visible tamper evidence due to their translucent or whitish appearance, for example.

In another preferred embodiment, the heat seals are peelable and have a substantially uniform peel strength in which the initial peel strength is generally comparable to the propagation peel strength. Preferably, the peel strength of the heat seals remains relatively constant over a range of temperatures such as 33° F.–120° F.

After or during the compression step, the processed cheese may be cooled to less than about 50° F., and preferably about 40° F., following or during the compression step.

A machine for packaging processed cheese using a plastic film having at least a base layer and at least one sealant layer also forms a part of the present invention. The machine includes a film former for forming the plastic film into an elongated enclosure having an opening, and a longitudinal sealing device for forming a longitudinal heat seal that closes the opening. A cheese source is provided for inserting hot molten processed cheese into the elongated film enclosure and into intimate heat transfer contact with the sealant layer within the elongated enclosure. The sealant has a seal activation temperature of less than about 200° F., and preferably less than about 180° F.–190° F., and is activated by the heat of the processed cheese. The machine also includes a cross-sealing device for compressing opposing portions of the plastic film across the width of the film enclosure at cross-sealing zones formed at periodic intervals to remove at least some of the cheese from the cross-sealing zones. The heat of the cheese activates the sealant and the combination of the heat of the cheese and the compression forms cross-seals that are heat seals at the cross-sealing zones, resulting in a package entirely enclosed by peelable heat seals. The machine also may have cooling means, such as a spray of chilled water, for cooling the heat seals, including preferably cooling the cross-seals immediately after their formation.

In one embodiment, the machine includes a cross-sealing device that includes a rotary crimping device. In another embodiment, the machine has a cross-sealing device that includes a pair of opposed flattening belts having periodic protrusions, followed by a rotary crimping device. The rotary crimping device may include a plurality of opposed pairs of crimping bars, each of the pairs including a crimping bar made of metal and a crimping bar made of a resilient material. The peel strength of the heat seals may be adjustable depending upon the food item to be packaged and the film selected.

In another embodiment, the invention is a plastic film for use in providing peelably packaged food items, such as processed cheese. The plastic film has a substrate, preferably of a polyolefin-based material, and a sealant with a preferred activation temperature of less than or equal to about 200° F. The film is capable of forming a package entirely enclosing the food item with peelable heat seals. Preferably, the heat seals are hermetic and have an initial peel strength which is generally comparable to their propagation peel strength.

In a particularly preferred embodiment, the film is a coextruded film, the sealant consists of either Surlyn or EMA, and the peelable heat seals are broken by cohesive failure. In another preferred embodiment, the heat seals have a peel strength that ranges from at least about 100 grams to about 1000 grams per 15 mm measured along the length of the seal. Preferably, the heat seals, upon being peeled, provide visible tamper evidence.

The described processes and machines may be employed using processed cheese as the packaged food item or, alternatively, may be used to package other heated food items, as those of ordinary skill in the art will appreciate.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIGS. 1A, 1B and 2 are diagramatic views of common peel failure mechanisms for packaging film.

DETAILED DESCRIPTION OF THE PREFERRED EMBODIMENTS

Set forth below is a description of what is currently believed to be the preferred embodiment and/or best example of the invention claimed. Future and present alternatives and modifications to this preferred embodiment are contemplated. Any alternatives or modifications which make insubstantial changes in function, in purpose, in structure or in result are intended to be covered by the claims of this patent.

With regard to processed cheese packaging, it was determined that film formulations providing a peelable heat seal at temperatures of 200° F. or less were required, since temperatures above 200° F. can cause carmelization of the processed cheese, including offcolor and unwanted odor. It is known, however, that a sealant layer of a packaging film must reach its activation temperature to ensure its flow and the formation of a proper heat seal.

A variety of film formulations were assessed, and certain ones were selected as likely candidates for use in processed cheese packaging, as discussed below. The films selected share several common attributes. First, they are multi-layered films consisting of at least one base layer and at least one sealant layer. Second, the sealant layers are activated at temperatures below 200° F. Third, the heat seals that are formed are peelable and preferably fail through cohesive failure, but may also fail through adhesive failure. Fourth, the films are all polyolefin-based formulations. Fifth, the sealant layers all achieve adhesion, in varying degrees, to a base film.

Various benefits accrue from the use of these film formulations and arise from these common attributes. First, as a result of the cohesive seal failure mechanism, the peelable heat seal that is formed provides a substantially even peel strength that allows a consumer to manually peel or separate the sealed package surfaces with a steady even force. Thus, the strength required to start peeling action (the "initial peel strength") is similar to that required throughout the peeling process (the "propagation peel strength"). This is in contrast to peeling systems commonly referred to as "burst-peel" systems, in which a dramatic decrease in the force is required propagate and complete the peel compared to the force required to initiate opening. Those of ordinary skill in the art will recognize that the principles of the present invention can be employed with packaging films designed to fail adhesively, but such films are not currently preferred since this can cause film failure or an unsightly appearance when the seal is broken during peeling. However, some of the film formulations mentioned below can be altered to provide films that undergo adhesive failure, if desired.

Second, the preferred film formulations disclosed below provide a seal strength that can be tailored for individual package requirements. For example, larger packages will generally require a higher peel strength to ensure that the heat seals do not fail during filling and packing. Certain of the polybutylene-based film formulations, for example, have a peel strength that ranges from about less than 100 grams to more than 1000 grams per 15 mm (1–10 Newtons/15 mm).

Third, these film formulations generally provide (although this is not necessarily essential) high clarity before opening, and an aesthetic peel surface with visible tamper evidence after opening. In other words, the heat seal area is relatively clear prior to opening. However, after peeling the seal, the seal area will appear whitish and translucent, due to nature of the cohesive failure mode and the corresponding exposure of the incompatibility between materials within the sealant layer.

Fourth, the peel strength of these film formulations remains relatively constant over a range of sealing temperatures, forming a useful operating plateau.

Fifth, the low seal initiation temperatures of these film formulations provide attendant advantages. Thus, cost savings benefits are provided due to increased production rates and reduced energy consumption. Also, low seal initiation temperatures can facilitate processing of perishable or heat-sensitive food products.

Sixth, these film formulations can be used with form-and-fill packaging machines that currently use polyester-based and polyolefin-based films.

Seventh, the sealant layer in these film formulations may be heat sealed to itself or directly to a base substrate surface. Also, the film formulations of the present invention may find advantageous use in packages that provide either lap or fin longitudinal seals. If necessary, a third adhesive layer, e.g., an EMA (ethylene methyl acrylate) layer, may be coextruded between the sealant and base layers to enhance the bond and guarantee cohesive failure, if there is a concern of adhesion of the sealant layer to a base film layer, as one example.

Eighth, each film formulation is based on a cohesive peel mechanism as opposed to the more common adhesive or delamination mechanisms. Unlike both adhesive or delamination seals (FIG. 1B), a cohesive seal, as illustrated in FIG. 1A, does not separate along the contact line between base and sealant layers. Instead, the separation in a cohesive system actually occurs within a sealant layer or between sealant layers, as shown in FIG. 2. More specifically, with a cohesive failure, the sealant layer consists of the dispersion of two phases, and the separation occurs between microscopic regions of these different phases within the seal layer. The attractive forces between the two different phases within the seal layer are weaker than the attractive forces between the major seal layer phase and the surface to which it is sealed. Thus, when the seal is peeled apart, the separation occurs between the two phases within the seal layer and not between film surfaces. The cohesive seal failure mechanism provides several advantages recited above, including a relatively uniform peel strength for the initiation, propagation and completion of the peel; good aesthetics of the package after opening; and visible tamper evidence. To form the required two-phase region, cohesive peel systems consist of blends of immiscible components. The intermolecular forces between these two phases should be strong enough to form a seal, yet weak enough to allow the controlled failure to propagate through the seal layer, resulting in a clean, uniform separation. A high-quality dispersion is necessary for a clean, uniform separation, with the immiscible components being readily dispersible, e.g., having a relatively low interfacial tension.

The films specially formulated for projected advantageous use as processed cheese packaging films according to the present invention are as follows. The chemical formulation is followed by the weight percentage for each polymer, and then by its commercial name.

Formulation No. 1:

| 18–28% VA content EVAs + PB (Polybutylene) | |
|---|---|
| 75% | 25% |
| DuPont Elvax 3128 | Montell PB 8340 |
| DuPont Elvax 3046 | Montell PB 8310 |
| Equistar UE 633 | |

Formulation No. 2:

| mPe ethylene-octene copolymer + PB (Polybutylene) | |
| --- | --- |
| 70% | 30% |
| Dow EG 8200 | Montell PB 8310 |
| EG 8180 | |

Formulation No. 3:

| mPe ethylene-octene copolymer + Tafmer A (ethylene-alpha olefin copolymer) + PB (polybutylene) | | |
| --- | --- | --- |
| 50% | 20% | 30% |
| 50% | 25% | 25% |
| Dow Affinity PL 1840 | | |
| Mitsui Petrochemical Tafmer A 4085 | | |
| Montell PB 8640 | | |

Formulation No. 4:

| Tafmer XR 107L + Tafmer A 4085 | |
| --- | --- |
| 70% | 30% |
| Mitsui Petrochemical | |
| Tafmer XR 107L propylene alpha olefin copolymer | |
| Tafmer A 4085 ethylene alpha olefin copolymer | |

Formulation No. 5:

| mPe ethylene octene copolymer + Tafmer A (ethylene alpha olefin copolymer) + Tafmer XR (propylene alpha olefin copolymer) | | |
| --- | --- | --- |
| 50% | 20% | 30% |
| mPe Dow Affinity PL 1840 | | |
| Mitsui Petrochemical | | |
| Tafmer A 4085 ethylene alpha olefin copolymer | | |
| Tafmer XR 107L propylene alpha olefin copolymer | | |

Formulation No. 6:

| Appeel 1181 + PB (polybutylene) Acid modified EVA blend | |
| --- | --- |
| 75% | 25% |
| DuPont Appeel 1181 | Montell PB 8340 |

Formulation No. 7:

| Surlyn 1857 + PB (polybutylene) | |
| --- | --- |
| 70% | 30% |
| DuPont ionomer Surlyn 1857 | Montell PB 8340 |

Formulation No. 8:

| Bynel 1123 + Surlyn 1650 + Conpol 20B + Conpol 20S2 | | | |
| --- | --- | --- | --- |
| 80% | 17% | 1.5% | 1.5% |
| DuPont Bynel 1123 Acid Mod. EVA | | | |
| DuPont Ionomer Surlyn 1650 | | | |
| DuPont Conpol Slip and antiblock concentrates | | | |

Formulation No. 9:

| Appeel XA626 + PB (Polybutylene) | |
| --- | --- |
| 75% | 25% |
| DuPont Appeel XA 626 | Montell PB 8340 |

Formulation No. 10:

| EMA (ethylene methyl acrylate copolymer) + PB (polybutylene) | |
| --- | --- |
| 75% | 25% |
| Chevron EMA 24% comonomer | Montell PB 8340 |

Each of these formulations are believed to comply with the Code of Federal Regulations, Title 21, Paragraph 175, 177 et. seq. covering use in direct contact with all types of food subject to the extraction limitations on the finished food contact articles as described in the regulations. Each formulation is also co-extrudable with polypropylene. The ratings/comments given in TABLE 1, below, are subjective ones by the inventors, based on past experience with other film formulations and with a variety of packaging form-and-fill machines.

TABLE 1

| Formulation No.: | 1 | 2 | 3 | 4 | 5 | 6 | 7 | 8 | 9 | 10 |
| --- | --- | --- | --- | --- | --- | --- | --- | --- | --- | --- |
| Seal Initiation Temp (° F.) | 190° | 185° | 180° | 190° | 190° | 190° | 175° | 180° | 180° | 175° |
| Hot Tack | Poor | Good | Good | Good | Good | Very Good | Excellent | Good | Good | Excellent |
| Peelability | Good | Good | Fair | Good | Satisfactory | Good | Good | Good | Good | Exoellent |
| Adhesion to Polypropylene | Good | Fair | Fair | Good | Fair | Good | Excellent | Good | Good | Excellent |
| Coefficient of Friction Slip Characteristics | High % slip Antiblock | Some Slip | Some Slip | Some Slip | Some Slip | Some Slip | High Slip | Formulated | Some Slip | High Slip |

TABLE 1-continued

| Formulation No.: | 1 | 2 | 3 | 4 | 5 | 6 | 7 | 8 | 9 | 10 |
|---|---|---|---|---|---|---|---|---|---|---|
| Requires Adhesive Layer/ Three Layer Coextrusion | No | Possibly* | Possibly | No | Possibly | No | No | No | No | No |

*For each of the "possibly" terms in this row, this depends on the specific need for a strong adhesive bond to the polypropylene in order to circumvent adhesive failure rather than cohesive failure of the sealant layer.

Various mechanisms and processes can be provided for forming heated cross-seals according to the present invention. For example, in one preferred embodiment, a two-step voiding process is employed. In the first step, the cheese ribbon is flattened by lugged forming belts, and the cheese is removed, at least in part, from the crimped areas or cross-sealing zones, and redistributed over the thickness of the ribbon, as disclosed in the Bush patent. During this time, the heat of the cheese activates the film sealant, and the combination of temperature and pressure on the sealant forms a heat seal along each cross-sealing zone. Some cheese may remain in the cross-sealing area following this voiding and flattening step. Both Surlyn and EMA, for example, are polymers with the desirable attribute of being able to seal through food item contamination. Immediately adjacent to the forming belts, a rotary crimping mechanism employing pairs of opposed crimper bars may be provided as disclosed in the Bush patent. In each pair, one opposed crimper bar may be made of stainless steel and have a knurled or smooth surface, while the other opposed crimper bar may be made of a resilient material such as polyurethane or silicone. The crimper bars may also be chilled using a direct spray of chilled water, or using internal cooling means well known in the art, such as chilled water run inside the crimper bar. Alternatively, any other expedient means for chilling the cheese ribbon may be employed, such as liquid immersion, frozen gas, etc. As the knurled and resilient crimper jaws come together on the previously voided area, heat may thus be drawn away from this area, allowing the sealant layer(s) to set. With processed cheese, cooling preferably occurs until the cheese within the plastic film has reached a temperature in a range of about 33–60° F., and preferably about 33–40° F. It is believed that a slight drop in temperature, possibly as slight as 10° F., termed in the claims a "non-substantial temperature drop" in the sealant layer immediately after crimping is enough to keep the sealant layer from breaking for the brief time prior to the ribbon entering the coolant bath. Accordingly, it is desirable that the temperature of the metallic crimp bars be kept sufficiently cooler than the sealant layer, so that the sealant layer transforms from a flowing state to a sufficiently viscous state. This will also ensure that little or no cheese will leak through the newly-formed heat seals, and that the latent heat of the adjacent cheese does not re-activate the sealant layer. The additional pressure applied by the crimper jaws further strengthens the heat seals, and removes any remaining cheese that may have been left in the cross-sealing zones. Preferably, the crimper jaws apply a pressure sufficient to remove substantially all of the cheese from the cross-sealing zones, yet the pressure is not so strong and/or the dwell time is not so long as to remove the sealant layer from the cross-sealing zones or to provide seals that are not peelable.

Of course, alternative techniques are possible for continuously providing peelable cross-seals that are heat seals while still using the heat of the food item to activate the film sealant layer(s). For example, instead of the two-step voiding process described above, a single-step voiding/crimping operation could be provided. In this process, the cross-sealing mechanism shown in the Meli II patent, for example, could be employed, while still using the heat of the food item to activate the film sealant, provided an appropriate film is selected. In a particularly preferred embodiment, mechanisms are employed for continuously providing a longitudinal seal and cross-seals which are each hermetically sealed, as disclosed for example in the Meli II patents.

The cross-seals are provided "nearly immediately" after heat and compression are applied at the cross-sealing zones which means, as that term is used in the claims, that the cross-seals are formed at a given film point within seconds or less of cheese insertion occurring at that film point.

In yet another alternative example, a single-step voiding process might be employed using a smooth flattening belt, for example, followed by, e.g., one or more pairs of rotary crimpers. With this embodiment, the resulting slice might be thickened on one end as a result of the single-step crimping action.

In still other alternative embodiments, any of the voiding and cross-sealing mechanisms described in the Meli I or Meli II patents could be employed to continuously provide cross-seals that are heat seals using the heat of the food item to activate the sealant layer(s), depending upon a variety of factors, including but not limited to: the strength of the desired seals; the machine speed desired; the machine expense allotted; the use of longitudinal seals that are either fin or lap seals; the film selected; the food item used; the package size, etc.

During use of the packaging films suggested here, various other factors may be considered. For example, if a two-step voiding procedure is used, some of the cheese may remain in the cross-sealing area following the initial voiding step. If this occurs, films with a relatively low seal strength may be inhibited in their ability to form an appropriate heat seal, unless the crimpers complete the removal of the food material. This is why it may be desirable to select polymers with good seal-through contamination.

Also, while non-oriented substrate film layers are currently preferred (to avoid additional film processing steps, and also because cast films tend to be lower cost), there may be some advantage in a particular application to using an oriented film, which may be stronger than a non-oriented film.

It should also be observed that the food item to be packaged may need to be heated, prior to insertion within the film, to a temperature slightly higher than the activation temperature of the film sealant, due to temperature losses to the environment and to the non-sealant portions of the film.

In addition, various additives may be provided to the film for different purposes. Thus, glycerol mono stearate can be added to the film to enhance cheese separation. Processing aids such as slip and antiblock additives may also be used as needed.

Of course, those of ordinary skill in the art will realize that other film formulations can be used to accomplish the general objectives of the present invention. Potential film substrates may include polyethylene and its variants (such as EVA (ethylene vinyl acetate), EMA (ethylene methyl acrylate), EEA (ethylene ethyl acrylate), HDPE, LDPE, LLDPE, linear LDPE, and metallocene polyethylenes), polypropylene, paper, nylon, cellophane, polyester, aluminum foil, polystyrene or acrylonitriles. Potential sealant layer compositions may include polyethylene and its variants, as well as waxes and other food-safe adhesives or coatings such as ionomers, polybutylene, acid-modified EVA, EMA, tackifiers such as terpenes, synthetic waxes and polyisobutylene.

Film processing techniques that can be utilized to provide packaging films useful with the present invention include, but are not limited to, extrusion, coextrusion, extrusion coating, lamination and dry lamination, for example.

It will be understood by those of ordinary skill in the art that the efficacy of a heat seal is a function of dwell time, sealing temperature and sealing pressure. It will also be understood that the particulars of such time, temperature and pressure will vary depending upon such variables as the film selected, the desired speed, the food item selected, the sealing equipment used, and the desired seal character. As examples, the sealing times, temperatures and pressures given in Meli I and Meli II (e.g., sealing times ranging from one hundredth of a second with rotary crimpers to ½–1 second with elongated chain sealing devices, and sealing temperatures of between about 230° F.–260° F. when polyethylene or polypropylene films are used) and/or in U.S. Pat. No. 4,586,317 to Bussell, incorporated herein by reference (e.g., 150–600 pounds per square inch of pressure) may be used depending upon the presence of applicable variables recited above.

While the present invention is believed to find particularly advantageous use in packaging processed cheese slices, it will be appreciated that the principles of the present invention may be extended to the packaging of other food items such as, but not limited to: cheese blends; pizza toppings; cheese and meat blends; natural cheese, meat and condiment blends; mayonnaise; peanut butter; jelly; cream cheese; cookie dough; ketchup; bar-b-que sauce; cheese and eggs; and candies. Of course, corresponding changes in temperature, film selection and packaging size, speed and techniques may be required, although little if any changes may be necessary with various food products comparable to processed cheese in texture and characteristics.

Although perhaps not preferred, it will be understood that the present invention may be adapted for use with either vertical fill-and-form machines as well as horizontal fill-and-form machines. For example, if a horizontal fill-and-form machine is used, the invention could be adopted for processes in which a longitudinal seal is not formed, and where the cross-sealed ribbon of food item, for example, is discharged onto a chill roller or chill belt.

Since, as disclosed above, polyethylene or similar materials may be used as the sealing layer, the packaging film is easily released from the processed cheese. This also obviates the need for items such as a shear pump to process the cheese so as to have a less cohesive texture and provide a better release.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

We claim:

1. A method for the continuous manufacture of peelably packaged processed cheese slices, comprising the steps of:

forming a continuously longitudinally moving plastic film into an elongated enclosure having an opening along its length, the plastic film including at least one base layer and at least one sealant layer having a seal activation temperature of less than or equal to about 200° F.;

continuously forming a longitudinal heat seal along the length of the enclosure that closes the opening;

continuously inserting hot molten processed cheese into the elongated enclosure;

as the plastic film continuously moves longitudinally, compressing opposing portions of the cheese-filled plastic film enclosure at cross-sealing zones located at periodic intervals along the length of the enclosure to remove at least some of the processed cheese from the cross-sealing zones, substantially only the heat of the processed cheese and no external heating device raising by heat transfer the temperature of the at least one sealant layer to the seal activation temperature, and the combination of the heat of the processed cheese and the compression forming hermetic cross-seals at the cross-sealing zones; and cooling the cross-seals to substantially reduce the temperature of each;

wherein the longitudinal seal and the cross-seals are hermetic and peelable, so that a hermetically sealed package entirely enclosing the processed cheese is formed.

2. The method of claim 1, further comprising the step of removing at least some of the processed cheese from the cross-sealing zones prior to the compression step.

3. The method of claim 1, wherein the step of cooling is provided using cooling water.

4. The method of claim 1, wherein the plastic film is extruded and comprises a non-oriented polypropylene film.

5. The method of claim 1, wherein the at least one sealant layer has an activation temperature below 200° F.

6. The method of claim 1, wherein the plastic film comprises a polyolefin-based formulation.

7. The method of claim 1, wherein the cross-seals are peelable through a cohesive failure.

8. The method of claim 1, wherein the heat seals are peelable using a substantially uniform peel strength in which the initial peel strength is similar to the propagation peel strength.

9. The method of claim 1, wherein the cross-seals, upon being peeled, provide visible tamper evidence.

10. The method of claim 1, wherein the base layer comprises polypropylene.

11. The method of claim 1, wherein the sealant layer comprises one or more of the following: polybutylene; ethylene acrylic acid; metallocene polyethylenes; ethylene-octene copolymer; ethylene-alpha olefin copolymer; propylene alpha olefin copolymer; ethylene alpha olefin copolymer; or ethylene methyl acrylate copolymer.

12. The method of claim 1, wherein the sealant layer comprises a polyolefin or its derivatives thereof.

13. The method of claim 1, wherein the peel strength of the heat seals remains relatively constant over a range of temperatures including 33° F.–120° F.

14. The method of claim 1, wherein the step of compressing is accomplished in a two-step process in which the elongated film enclosure containing the processed cheese is passed through a pair of opposed flattening belts having periodic protrusions and then through a rotary crimping device.

15. The method of claim 1, wherein the step of compressing is accomplished by passing the elongated film enclosure through a pair of opposed, substantially smooth flattening belts and then through a crimping device.

16. The method of claim 1, wherein the processed cheese is cooled to less than about 50° F. following or during the compression step.

17. The method of claim 1, wherein the processed cheese is cooled to about 40° F. following or during the compression step.

18. The method of claim 1, wherein the plastic film comprises an extruded film.

19. The method of claim 1, wherein the plastic film comprises a solution cast or calendered material.

20. The process of claims 1, wherein the film is formulated to provide easy releasability from the processed cheese slices.

21. A method for continuously providing peelably packaged slices of food items using an extruded plastic film having at least one base layer and at least one sealant layer having a seal activation temperature, comprising the steps of:

continuously forming the plastic film into an elongated film enclosure having an opening;

continuously forming a longitudinal heat seal along the enclosure that closes the opening;

continuously inserting a hot food item into the elongated film enclosure;

as the plastic film continuously moves longitudinally, compressing opposing portions of the food item-filled plastic film across the length of the film at cross-sealing zones located at periodic intervals along the length of the enclosure to remove at least some of the food item from the cross-sealing zones, substantially only the heat of the food item and no external heating device raising by heat transfer the temperature of the at least one sealant layer to at least the seal activation temperature, and the combination of the heat of the food item and the compression forming cross-seals that are heat seals at the cross-sealing zones, to thereby form a package entirely enclosed by peelable heat seals;

wherein upon peeling the cross-seals exhibit cohesive failure.

22. The method of claim 21, further comprising the step of cooling the cross-seals immediately after their formation.

23. The method of claim 21, wherein the heat seals of the longitudinal seal and the cross-seals are each hermetic, so that a hermetically sealed, peelable package entirely enclosing the food item is formed.

24. The method of claim 21, wherein the peel strength of the heat seals is adjustable depending upon the food item to be packaged and the film selected.

25. A process for continuously providing peelably packaged slices of food items using an extruded plastic film including at least one base layer and at least one sealant layer having a seal activation temperature, comprising the steps of:

continuously shaping the plastic film into an elongated film enclosure having an opening along its length;

continuously forming a longitudinal hermetic seal along the length of the enclosure that closes the opening;

continuously inserting a hot food item into the elongated film enclosure;

as the plastic film continuously moves longitudinally, compressing opposing portions of the food item-filled plastic film across the length of the film at cross-sealing zones located at periodic intervals along the length of the enclosure to remove at least some of the food item from the cross-sealing zones, substantially only the heat of the food item and no external heating device raising by heat transfer the temperature of the at least one sealant layer of the plastic film to at least its seal activation temperature, and the combination of the heat of the food item and the compression forming hermetic cross-seals nearly immediately after the heat and the compression are applied at the cross-sealing zones, to thereby form a hermetic package entirely enclosed by peelable hermetic seals;

wherein upon peeling the cross-seals exhibit cohesive failure.

26. The process of claim 25, wherein cross-seals that are heat seals are maintained during a non-substantial temperature drop occurring after seal formation.

27. The process of claim 26, further comprising the step of cooling the food item-filled packages after formation of the longitudinal seals and cross-seals, to substantially reduce the temperature of the packages.

28. The process of claim 27, wherein the cooling step is accomplished by submerging the packages in a cooling liquid bath.

29. The process of claim 25, wherein substantially all of the food item is removed from the cross-sealing zones during the compression step.

30. The process of claim 25, wherein the film is formulated to provide easy releasability from the food item.

* * * * *